3,677,852
PROCESS FOR MANUFACTURING BELTED TIRES

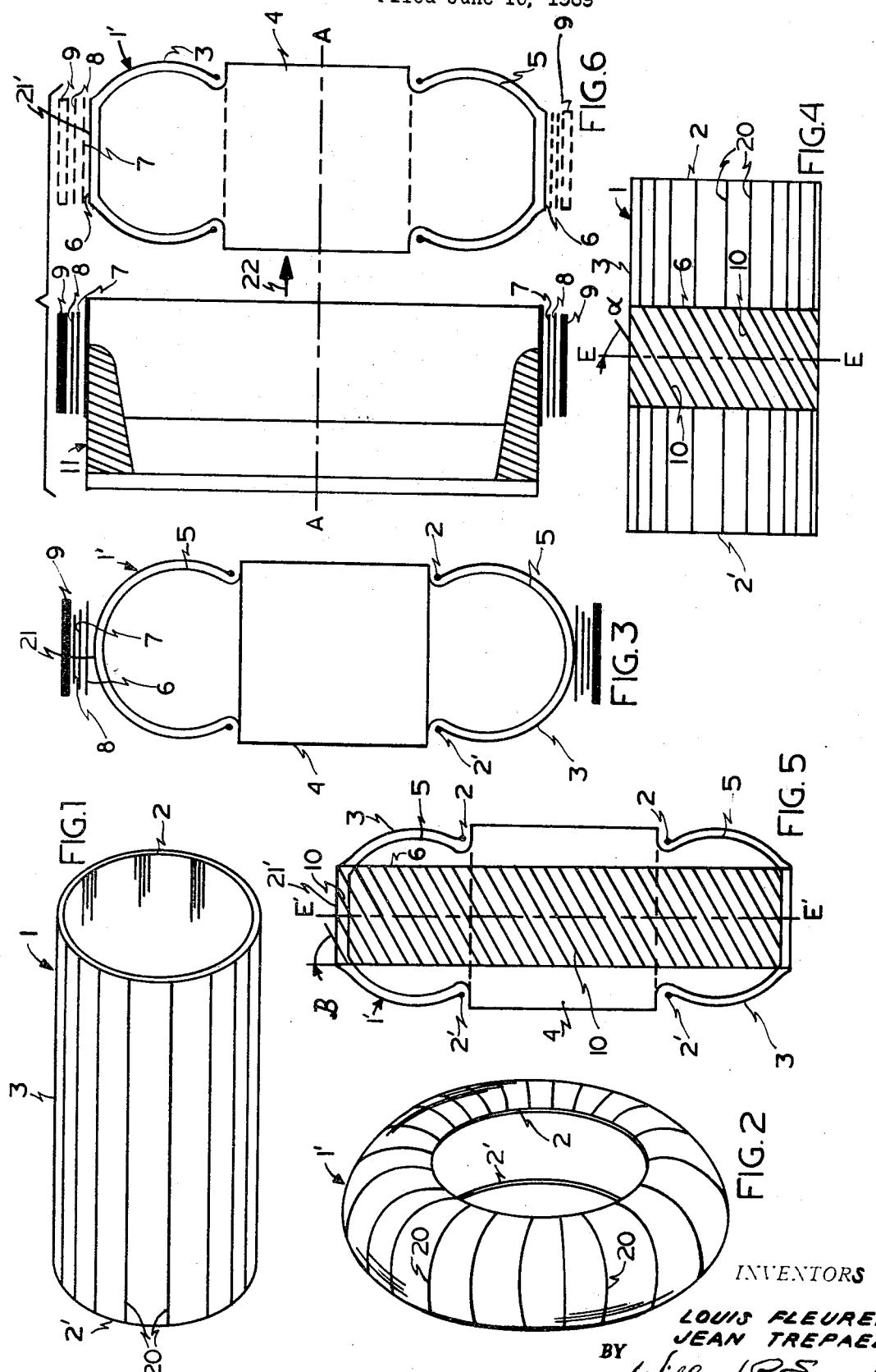

Louis Fleuret and Jean Trepaez, Compiegne, France, assignors to Uniroyal Engelbert France S.A., Neuillyl Seine, France
Filed June 10, 1969, Ser. No. 831,863
Claims priority, application France, June 12, 1968, 154,777
Int. Cl. B29h 17/26
U.S. Cl. 156—127                    5 Claims

ABSTRACT OF THE DISCLOSURE

In the manufacture of radial ply tires having an annular multi-ply belt between the carcass crown and tread, a cylindrical casing is first prepared and a first belt ply is placed annularly about the casing while it is still in cylindrical form, i.e., prior to toroidal shaping. An incomplete belt assembly with one less ply is prepared, and annularly surrounded by a tread member. Subsequently the tread and incomplete belt assembly are placed annularly about the casing and first belt ply, after which the assembled casing and first belt ply is expanded to force the first belt ply radially outward into contact with the remainder of the belt and tread assembly to complete the shaped raw tire. Finally, the completed assembly is cured by conventional methods to mold the components into a unitary belted tire structure.

FIELD OF THE INVENTION

This invention relates generally to the manufacture of pneumatic tires for vehicles, and is particularly concerned with belted tires of the radial ply type.

BRIEF SUMMARY OF THE PRIOR ART

One of the principal varieties of tire presently in use is the radial ply type, the casing of which incorporates fabric body plies having cords which are oriented parallel to the meridian planes of the toroidal casing. It is customary for this type of tire to include an annular belt which comprises several plies of cord fabric and is interposed between the carcass crown and the tread.

Another form of vehicle tires, the bias ply type, may also have such a belt, and is conventionally manufactured by a process in which the tire casing is first formed as a cylinder incorporating two or more body plies whose cords are bias-oriented in mutually intersecting directions. Subsequently, the belt plies, if any, are placed annularly about the cylindrical casing, after which the tire is toroidally shaped and inflated. During the inflation step, the casing expands radially outwardly and exerts a strain upon all the fabric layers of the casing and belt, which causes their cords to twist in such a way as to decrease their angle relative to the equatorial plane of the torus, a process known as "pantographing."

But the belts employed in radial ply tires are necessarily far less elastic than those used in bias ply tires, and they also have a different cord angle pattern, as a result of which radial ply tire belts, when pantographed to a significant extent, induce non-homogeneous strain patterns in the tire. For this reason, it has been necessary until now to shape the casing of a radial ply tire into toroidal form and inflate it prior to placing the belt around the crown. This has been done either by assembling all the belt plies into a completed belt assembly and placing this completed assembly about the casing crown, or by building up the belt upon the casing crown through the placing of successive belt plies around it.

But both of these approaches have significant disadvantages. If the belt is completely assembled elsewhere and then placed as a unit about the casing crown after the casing is already shaped and inflated, the belt makes inadequate surface contact with the casing. The completed belt assembly is an annular band of essentially flat cross-section, and is relatively rigid owing to the fact that it includes a plurality of plies with intersecting cord directions. The crown of the shaped, inflated casing, on the other hand, has a complex rounded outer peripheral shape since the cross-section of a torus is circular in two directions. Thus the flat belt and the compound-curved surface of the casing crown are able to make contact with each other only along a narrow line, instead of over a broad area co-extensive with the entire inner surface of the belt. As a result, it is difficult to deform the belt assembly into broad area contact with the casing.

This problem is particularly acute in the manufacture of exceptionally large tires, such as those used on construction equipment. These tires are quite massive, and the belt assemblies incorporated therein are correspondingly thick and rigid. It is therefore especially difficult to deform such a rigid belt into conforming relationship with a compound-curved crown surface.

If the belt is built up on the shaped casing layer by layer, this problem is eased somewhat, since each individual belt ply is more flexible than the completed belt assembly, and is thus more easily deformed to accommodate itself to the shape of the casing crown. However, a different problem is then encountered, in that each belt ply must be individually registered with the toroidal casing so that their equatorial planes coincide. The cumulative delay which this engenders is intolerable in a mass production tire manufacturing process.

BRIEF SUMMARY OF THE INVENTION

The present invention resides in an improved process for making belted tires, particularly those of the radial ply type, which process easily achieves broad area contact between the belt assembly and shaped casing assembly, but at the same time avoids the difficulties of multiple alignment steps relative to a toroidal surface. The process also results in a higher quality tire, and is economical in that it simplifies the design of automatic belt-building equipment and is substantially faster and therefore more productive.

In accordance with the invention, these advantages are achieved by placing a single innermost belt ply about the tire casing while it is still in cylindrical form. Thereafter the tire casing is toroidally shaped and inflated with that belt ply already in place, so that the belt ply restrains the crown in hoop fashion to hold it to a flat cross-sectional shape which easily accepts an annular belt assembly that is also of flat cross-section. The remaining belt plies are assembled elsewhere to form an incomplete unit which is one belt ply short, and this incomplete unit (which preferably includes the tread member) is subsequently placed about the assembly of the partially shaped casing and inner belt ply. At this time broad contact between the two is easily achieved because a flat incomplete belt assembly is placed about the flat belt-ply-covered carcass. Subsequently the casing is further inflated to press the inner belt ply and the remaining belt plies into assembled relationship to form a completed belted raw tire which can then be cured into final form.

Note that in this process there are only two occasions when an annular band must be accurately registered with the casing: first when the innermost belt ply is put in place; and again when the incomplete belt assembly and tread are placed over the innermost belt ply. In both these instances the surface over which the band is placed is then flat (i.e. cylindrical instead of toroidal). This is in contrast to prior art manufacturing methods, which require each belt ply and the tread member to be individually registered with an already toroidally shaped casing.

BRIEF DESCRIPTION OF THE DRAWINGS

FIGS. 1 through 3 illustrate the prior art approach to manufacturing belted radial ply tires. FIG. 1 is a perspective view of a cylindrical tire casing; FIG. 2 is a perspective view of the same tire casing after it has been toroidally shaped; and FIG. 3 is a diagrammatic vertical section of the toroidal tire casing of FIG. 2 mounted upon a drum and bladder assembly, with successive belt plies and a tread member placed annularly thereabout.

FIGS. 4 through 6, on the other hand, illustrate the method of the present invention. FIG. 4 is a front elevational view showing a cylindrical tire casing with a single innermost belt ply annularly encircling it; FIG. 5 is a diagrammatic vertical section of the same tire casing and innermost belt ply after the casing is mounted upon a drum and bladder assembly and toroidally shaped; and FIG. 6 is a diagrammatic vertical section of the same drum and bladder assembly, casing, and belt ply, plus another drum on which the remaining belt plies and the tire tread are assembled into a unit for subsequent placement about the toroidally shaped casing and innermost ply.

The same reference characters refer to the same elements throughout the several views of the drawing; except that FIGS. 1 through 3 illustrate the use of various tire components in a prior art manufacturing process, while FIGS. 4 through 6 illustrate the use of these same tire components in a manufacturing process according to this invention.

Detailed description of prior art processes (FIGS. 1 to 3)

In a conventional process for manufacturing belted radial ply tires, illustrated in FIGS. 1 through 3, the first step is to make a cylindrical tire casing 1 which terminates at opposite ends in circular bead areas 2 and 2'. In industry terminology, a "radial" ply tire casing incorporates rubber-coated cord fabric body plies, for example the outermost body ply 3, the cords 20 of which initially extend axially of the cylindrical casing 1. Subsequently the cylindrical casing 1 is shaped, by bringing the bead areas 2 and 2' axially toward each other within the interior of the cylinder 1, to form a generally toroidal tire casing 1'. After such shaping, the direction of the body ply fabric cords 20, as they extend over the side walls of the casing, is radial relative to the torus. The shaping step is usually done by mounting the cylindrical casing 1 over a cylindrical drum 4 and an inflatable bladder 5 which is secured to the drum 4, and is initially deflated. Then the bladder 5 is inflated to push radially outwardly against a crown region 21 while the tire is shaped to the desired toroidal configuration of the casing 1'.

The next step in the manufacture of a belted radial ply tire by prior art methods is to encircle the crown region 21 of the toroidal casing 1' annularly with a belt comprising a plurality of rubber-coated cord fabric plies, for example three plies 6, 7, and 8 in a typical instance. In addition, the belt assembly 6, 7 and 8 and the toroidal casing 1' are annularly encircled by a rubber tread member 9. The tire components 6 through 9 may be put in place successively, in which case four separate operations are required to register the equatorial plane of each belt ply 6, 7 and 8 and the tread member 9 with the equatorial plane of the toroidal tire casing 1'. These four separate operations are intolerably time consuming in a rapid mass production tire manufacturing process.

But the other alternative, which is to assemble tire components 6 through 9 as a complete belt and tread unit, and then place that completed unit about the toroidal casing 1' in a single registration step, also presents serious difficulties. It is clearly evident in the sectional view of FIG. 3 that the flat cross-sectional shape of the internal surface of the unit 6, 7, 8, 9 does not match the external surface shape of crown region 21 of the toroidal casing 1', which has a compound curvature owing to the fact that a torus has a substantially circular cross-sectional shape in two mutually perpendicular directions. As a result, the innermost belt ply 6 and toroidal casing 1' make contact with each other only along a narrow annular line coinciding with the equatorial plane of the casing, rather than over a broad area co-extensive with the entire inner surface of belt ply 6.

It is difficult to force the assembly of the tire components 6 through 9 into broad area contact with the compound-curved crown of the toroidal casing 1'. When the tire being manufactured is exceptionally large, as is the case for the tires of construction vehicles and the like, the difficulty is compounded.

Detailed description of the preferred embodiment of the invention (FIGS. 4 to 6)

In order to resolve these problems in accordance with the present invention, FIG. 4 shows that the cylindrical tire casing 1 is encircled annularly by the innermost belt ply 6 prior to toroidal shaping. As an initial advantage, it is considerably easier to apply the inner belt ply 6 to the relatively small diameter cylindrical body 1 than it is to apply it over the much larger diameter of the inflated and toroidally shaped casing 1' according to the prior art method illustrated in FIG. 3. It is also a simpler and less time-consuming step to register the ply 6 with the flat surface of the cylindrical body 1 than with the compound-curved surface of crown region 21, as in the prior art step of FIG. 3. Moreover, contact between belt ply 6 and cylindrical casing 1 is established over a broad area co-extensive with the entire internal surface of ply 6, owing to the fact that both these elements have flat cross-sectional shapes.

During the next step of the manufacturing process according to this invention, the cylindrical tire casing 1, with the inner belt ply 6 in place thereon, is placed about the drum 4 and bladder 5. The latter is inflated as illustrated in FIG. 5, expanding the crown region 21' and the surrounding inner belt ply 6 radially outwardly, while the tire is shaped to form a substantially toroidal casing 1'. However it is evident from FIG. 5 that the crown region 21' retains a flat cross-sectional shape due to the hoop restraint exerted thereon by the innermost belt ply 6. During inflation of bladder 5, the innermost belt ply 6 is forced to stretch from an initial diameter approximately equal to that of the cylindrical casing 1 to the larger diameter of the toroidally shaped casing 1', and in the process it experiences a considerable degree of hoop tension, resulting in the described flattening of the crown region 21'.

As a result of the tensile stress thus exerted on the fabric of the belt ply 6, it is distorted so that its cords 10 twist, from an initial angle alpha relative to the equatorial plane E—E of the casing 1 prior to shaping (as seen in FIG. 4), to a smaller angle beta relative to the equatorial plane E'—E' of the toroidally shaped tire casing 1' (as seen in FIG. 5). It is well within the present skill of the tire manufacturing art to determine in advance what the desired final angle beta should be, and from this figure to calculate the initial angle alpha required to produce that end result. The cosine law is a well known relationship which is used in the tire industry to determine the degree of angle alteration which will occur between initial and final values under known manufacturing circumstances. In a typical instance of tire manufacture in accordance with the process of this invention, if a tire casing of the 12.00–20 size is to be manufactured with a final cord angle beta=70°, an initial value of the order of alpha=75° would ordinarily be chosen.

It is also very important that the described deformation of the innermost belt ply 6 occur in a manner which imparts homogeneous strains to it and to the underlying tire casing 1'. This is in contrast to the non-homogeneous strains which are introduced if the entire belt assembly, including all three plies 6, 7 and 8, is placed about the casing 1 while it is still in cylindrical form, and subsequently subjected to the shaping step illustrated in FIG. 5. Such non-homogeneous strains result from the relative rigidity of the belt plies 6, 7 and 8 taken together, as well as from the angular relationship between their respective fabric cords. In the final product, the three belt plies are normally arranged so that the cords of the inner ply 6 are at an angle beta relative to the equatorial plane E'—E' of the toroidal tire casing 1', while the cords of the middle ply 7 and outer ply 8 cross each other symmetrically relative to the equatorial plane E'—E' but at a different angle thereto from the angle beta of the inner ply 6. An inherent asymmetry is thus created by the lack of a belt ply placed symmetrically to ply 6, and by the inequality of the cord angle between plies 6 and 7 relative to the angle between plies 6 and 8. If these final angle values had to be obtained from somewhat larger initial values by pantographing of all three belt plies 6, 7 and 8 during the shaping process, the interaction between the cords of adjacent belt plies 6, 7 and 8 and between the cords of the inner belt ply 6 and outer body ply 3 would induce asymmetrical and therefore non-homogeneous strains in all the tire components 3, 6, 7, and 8; a result which is considered undesirable, and which the present process avoids. Thus it is a significant advantage of this invention that it results in a higher quality tire.

Another advantage of the present process is that it is more economical from the standpoint of the cost of equipment. Specifically, the described difference between the cord angle of the inner belt ply 6 and the symmetrical cord angles of the other two belt plies 7 and 8 permits the design of automatic belt-building equipment to be simplified. Since the one belt ply which has a different angle, ply 6, is mounted separately upon casing 1, automatic machinery for accomplishing this can be designed to deal only with the one cord angle of ply 6 during a particular production run, and need not be designed also to handle the different cord angle of plies 7 and 8 during that same run. The handling of the latter plies can be carried out by another piece of automatic equipment which is also designed to handle only one cord angle during any one production run. This the complexity and cost of production equipment is reduced.

In the next process step according to this invention (illustrated in FIG. 6), the drum 4 and bladder 5, upon which the toroidally shaped tire casing 1' and innermost belt ply 6 are mounted, are placed coaxially (see the common axis A—A) with another cylindrical or drum-shaped element 11 upon which the remaining belt plies 7 and 8 and the tread 9 have been assembled. The middle belt ply 7 is placed directly on and annularly about the drum 11, after which the outermost belt ply 8 is placed annularly over ply 7, and finally the tread member 9 is placed annularly about the plies 7 and 8. It is a simple and brief step to align the elements 8 and 9 with the middle belt ply 7 at this stage of the process, because of the fact that all the elements retain a flat cross-sectional shape upon the cylindrical drum 11. This is in contrast to the registration difficulties experienced when the belt plies 6, 7 and 8 and tread member 9 must be placed successively about a compound-curved crown region 21 as in FIG. 3 illustrating the prior art procedure.

After the elements 7, 8 and 9 have been assembled upon the cylindrical drum 11 in the manner illustrated in FIG. 6, they are transferred axially, as indicated by arrow 22, into annular encircling relationship about the innermost belt 6 and the flat crown region 21' of the toroidally shaped tire casing 1'. Once again the step of registering the flat assembly of the belt and tread elements 7, 8 and 9 with the assembly of the innermost belt ply 6 and the toroidal casing 1' is a simple and brief operation owing to the correspondingly flat configuration of the crown region 21' and innermost belt ply 6. It is only when the registering operation must be performed on a compound-curved surface that it becomes difficult and time-consuming.

After the assembly of the elements 7, 8 and 9 has thus been placed annularly about the assembly of the elements 1' and 6, additional inflating pressure is applied to the bladder 5, forcing the crown region 21' and the innermost belt ply 6 to expand radially outwardly until the outer surface of ply 6 is pressed into intimate contact with the inner surface of the middle belt ply 7. This completes the final assembly of the belt plies 6, 7 and 8.

Note that when contact between the plies 6 and 7 is made a broad area contact over the entire outer surface of ply 6 and the inner surface of ply 7 is assured, since both of these elements retain their flat annular band shape. Moreover, the contact is made under considerable pressure exerted by the inflated bladder 5, so as to secure all the tire components 1', 6, 7, 8 and 9 firmly together mechanically into a single unit.

The final step in the manufacturing process is the conventional one of incorporating the entire assembly of the tire casing 1', the belt assembly 6, 7, 8 and the tread member 9 into a unitary tire structure by the application of curing heat and pressure. This causes the rubber tread member 9, the rubber-coated fabric of the belt plies 6, 7 and 8, and the rubber-coated fabric of the body plies (for example, body ply 3) all to become integrally molded with each other so that the belt plies 6, 7 and 8 are ultimately embedded between the tread 9 and the crown region 21'.

It will now be appreciated that the process of this invention provides a simple, economical and rapid method for manufacturing higher quality belted tires, particularly those of the radial ply type, and that the process has the advantage of simple, rapid registration between the tire components, yet completely avoids the need for forcing the belt and tread components to conform to a compound-curved crown.

While there has been described what is at present considered to be the preferred embodiment of this invention, it will be obvious to those skilled in the art that various changes and modifications may be made therein without departing from the invention, and it is, therefore, intended to cover all such changes and modifications as fall within the true spirit and scope of the invention.

The embodiments of the invention in which an exclusive property or privilege is claimed are defined as follows:

1. A process for manufacturing a tire having a toroidal casing and a belt including a selected number of plies annularly surrounding said casing; said process comprising the steps of:
    making a substantially cylindrical casing and afterward forming said casing into a toroidal shape;
    placing a first one of said belt plies annularly about a crown region of said casing while said casing is still in said cylindrical form;
    making an incomplete belt assembly with one less ply than said selected number;
    first toroidally shaping the casing until said crown region is initially expanded radially outward to a sufficient extent to enlarge the annular diameter of said first belt ply, for exerting hoop tension thereon prior to placing said incomplete belt assembly thereabout;
    then placing said incomplete belt assembly annularly about said first belt ply and casing;
    and then further expanding said crown region radially outward until said first belt ply is pressed against said other belt plies whereby to complete said belt.

2. A process as in claim 1 for making a tire having a tread annularly surrounding said belt and casing; said process further comprising the steps of:
    placing said tread annularly about said belt;
    and afterward securing said tread and belt to said casing to form a completed tire incorporating said completed belt.

3. A process as in claim 2 wherein:
    said tread is placed about said incomplete belt assembly prior to expanding said first belt ply against said incomplete belt assembly.

4. A process as in claim 3 wherein:
said tread is placed about said incomplete belt assembly prior to placing said incompletely belt assembly about said first belt ply and casing;
and then said incomplete belt assembly and tread are placed as an assembled unit annularly about said first belt ply and casing.

5. A process as in claim 4 wherein:
the securing of said tread and belt to said casing is accomplished by forming said tire into an integrally molded body incorporating said casing, tread and completed belt.

References Cited

UNITED STATES PATENTS

| 1,488,343 | 3/1924 | Hoffman | 156—128 |
| 2,292,286 | 8/1942 | Owen | 156—127 |
| 3,236,709 | 2/1966 | Carver | 156—128 |

FOREIGN PATENTS

| 600,469 | 6/1960 | Canada | 156—126 |
| 650,198 | 2/1951 | Great Britain | 156—126 |
| 956,188 | 4/1964 | Great Britain | 156—128 |
| 1,159,632 | 12/1963 | Germany | 156—128 |

BENJAMIN A. BORCHELT, Primary Examiner

S. C. BENTLEY, Assistant Examiner